M F. DONAHAE.
GROUSER FOR TRACTOR WHEELS AND THE LIKE.
APPLICATION FILED MAY 8, 1922.

1,432,975.

Patented Oct. 24, 1922.

M Florin Donahae.
INVENTOR.

BY
ATTORNEYS

Patented Oct. 24, 1922.

1,432,975

UNITED STATES PATENT OFFICE.

M FLORIN DONAHAE, OF LOS ANGELES, CALIFORNIA.

GROUSER FOR TRACTOR WHEELS AND THE LIKE.

Application filed May 8, 1922. Serial No. 559,333.

*To all whom it may concern:*

Be it known that I, M FLORIN DONAHAE, a citizen of the United States, and a resident of Los Angeles, in the county of Los Angeles and State of California, have invented new and useful Improvements in Grousers for Tractor Wheels and the like, of which the following is a specification.

This invention relates to tractors and similar vehicles which are required to secure traction in soft or plowed ground, and pertains more particularly to a grouser or lug for the drive wheels of the above type of vehicles.

The invention has for its main object to provide a grouser which is capable of being used on either the left hand or the right hand side of either a left hand or right hand wheel of a tractor.

It will be understood in the consideration of the invention that grousers as now made are necessarily of two types; namely, left hand and right hand, and it is necessary to keep in stock some of each type for replacements. As a result a tractor operator often finds that one type wears more rapidly and a number of the other type kept in stock are not used. Obviously the provision of a grouser which may be used universally on a tractor will result in economy and lower first cost.

Another object of the invention is the provision of a device of the above character which, in addition to being adapted for universal application, will have increased wearing surface and longer life.

Another object of the invention is to provide grousers of such design that should a point or face of one grouser become broken or worn the tractor operator may, by slight adjustment arrange the broken or worn grouser so that it presents a new point and face. It will be understood that in present designs of grousers, when a point or face becomes unfitted for use, the grouser must be discarded and be replaced by a new one. This new one, obviously, must be the correct type; left or right hand, as the case may be; necessitating keeping in stock a plurality of each type.

Another object of the invention is to provide a tractor wheel with removable grousers which are so designed and arranged that new grouser faces and points may be placed in operative position as other faces and points wear, without requiring any new grousers.

Another object of the invention is to provide a grouser which together with the other objects and advantages is of such design that with a given thickness of walls greater stresses may be resisted, and less strain will be placed upon the bolt which holds it to the tractor wheel rim.

A further object of the invention is to provide a grouser that will be more securely held to the tractor wheel with the usual single bolt employed.

Other objects and advantages will appear hereinafter.

I have illustrated by the accompanying drawings one form of my invention, and have illustrated a specific application of the invention, which form of the invention I may modify as occasion requires, without enlarging the scope of, or departing from the spirit of my invention, within the appended claims.

In the said drawings.

Figure 1:
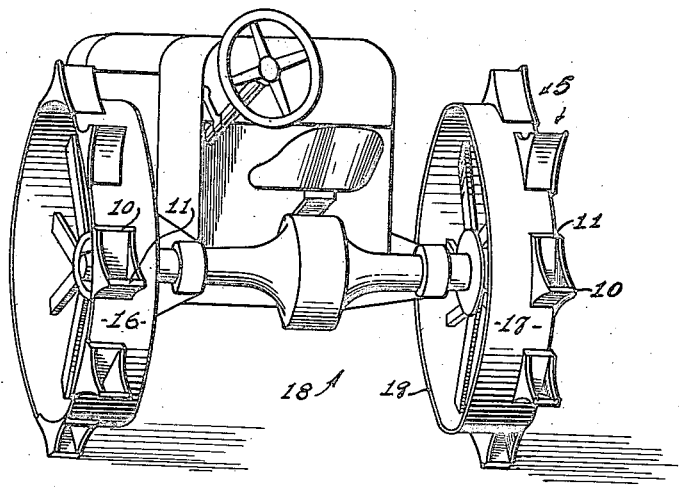
Figure 1, is a view in rear perspective, a usual form of tractor with my improved grousers applied thereto.
Figure 2:
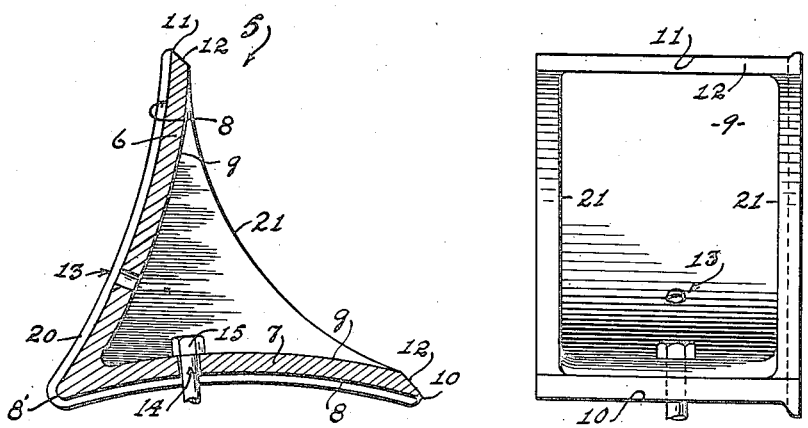
Figure 2, is a view in vertical section of the said form of the invention.
Figure 3:
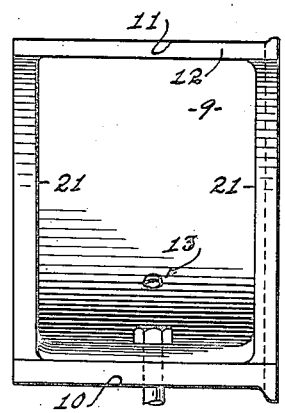
Figure 3, is a view in front elevation thereof.

More specifically, 5 indicates the grouser, which in manufacture may be made of any suitable metal, such as iron or steel, and which may be formed by casting, stamping or forging. The salient feature of the invention resides in two opposed walls 6 and 7, which converge to join one another as at 8' to form an integral unit. Said walls are essentially of substantially the same length, form and thickness, and in all other respects are practically identical. Each wall is provided with an outer arcuate face 8, formed with a given curvature for a purpose hereinafter set forth, and each of said walls is also provided with an inner face 9 which extends substantially parallel with face 8.

The opposed walls are arranged so that each of the faces 9 are adjacent each other, and therefore the faces 8 are always outermost. At the outer end of one wall a point 10 is provided, and similarly a point 11 is provided at the outer end of the other wall. Each point is formed by an inclined surface 12 which extends from the inner to the outer face. It will be seen now that each of the walls provides a face and point, and therefore each grouser possesses two faces and two points. Each wall is also formed with a bolt hole 13 and 14 respectively, through either one of which a bolt 15 may be passed.

To illustrate the application of my invention I have shown in Fig. 1, a pair of wheels 16 and 17 respectively, of a tractor 18. Viewed from the rear of the tractor wheel 17 is designated as the right hand wheel and wheel 16 as the left hand wheel. The wheels are each shown provided with a plurality of the grousers, and said grousers are shown secured to a rim 19 of each wheel in the usual manner by means of the bolts 15. To further secure the grouser each of the walls thereof is formed with a flange 20 following the outer face of each wall. The flange is disposed contiguous with the rim of the wheel. The flange may be omitted to meet requirements in some types of tractors, or flanges may be provided on each side of the grouser where there is proper provision made in the design.

The curvature provided on each outer face enables that face which is adjacent the wheel rim to lie contiguous with it. Therefore either one of the outer faces may be placed against the wheel rim so as to leave the outer wall projecting outermost in operative position. In usual grouser designs the grouser face generally extends in a path offset 30 degrees in the direction of normal rotation from true radial position.

By reference to Fig. 1, it will be seen that all the grousers shown on the tractor wheels are identical in form, size and arrangement of parts enumerated. Universal arrangement of the grousers, such as on either side of either wheel, is made possible by my improved design.

To illustrate how replacement of broken points or worn faces may be accomplished without discarding any grousers until both points of a grouser are unfitted for use; let us assume that a grouser on the left hand wheel of the tractor shown becomes broken or worn so as to require replacement. Said grouser is interchanged with any grouser on the right hand wheel. In order to place the said worn grouser on the right hand wheel it must be turned so that the point opposite to the worn one is disposed in operative position. The grouser removed from the place where the worn grouser is attached is then transferred to the left hand wheel and its other point or face is outermost. Thus a worn or broken point is replaced by a point without discarding any of the grousers.

Grousers are often used on each side of a wheel rim, and it will be seen that in such a case one of my improved grousers on the inner edge of one wheel will correspond in position to another grouser on the outer edge of the other wheel. By using grousers on both the inner and outer edges of both wheel rims, interchanging of grousers may be carried on as described above.

Interchanging of grousers may be carried on, in any case, until each grouser in operation has a broken or worn face or point in operative position, and these grousers may each in turn be used until both points are worn or broken before the grouser has to be discarded. Should the second point or face require replacement the grouser must be discarded. It will be apparent, however, that a tractor completely equipped with new grousers constructed in conformance with my invention will not require so much as one new grouser until all grousers have both points worn away or broken.

It will be apparent now that I have provided a grouser which includes a flange on one side thereof, and which in spite of this flange, may be placed either on the inner or outer side of either wheel of a tractor, and in addition to the advantages accruing from interchangeability my improved grouser also provides twice as much wear, in addition to being of such uniform design and proportion, that it will stand greater stresses. Incidentally the grouser permits of a comparatively simple casting, and during casting the faces may be chilled. Practically no more metal is required than in usual designs of grousers, while the surface of the grouser abutting the wheel rim is materially increased in area.

I claim:

1. A grouser for tractors and the like, including two diverging walls, each capable of serving either as a base for the grouser or as a grouser blade.

2. A grouser for tractors and the like, including two diverging walls, each formed with a point and face and a flange on the same side of each wall, whereby said grouser may be placed on either side of either wheel of a tractor with a face and point disposed in operative position for either direction of rotation of the wheel to which it is secured.

3. A grouser for tractors and the like, including two diverging walls, each formed with a grouser face and an inclined surface extending outwardly from said grouser face to form a grouser point on the outer end of each of said walls; whereby said grouser may be disposed on either side of a tractor wheel with one of said points in operative position and with one of said inclined surfaces sloping upward and backward relative to the direction in which said wheel is to rotate.

4. A grouser for tractors and the like, including two diverging walls having their inner adjacent surfaces formed to provide grouser faces and having their outer faces formed to extend contiguous to a tractor wheel, whereby either one of said outer walls may be disposed in operative position with the other walls positioned to serve as a grouser blade.

5. A grouser for tractors and the like, including two diverging walls having their outer ends formed with grouser points, each wall having an outer surface formed with a curvature approximating that of the wheel to which it is to be secured and each formed with a bolt hole.

6. In combination with a tractor wheel, a plurality of grousers, each formed with a flange on one edge thereof and each having two diverging walls so arranged relative to said flange that any one of said grousers may be placed on either edge of said wheel with one of said walls extending tangentially outward from the rim of said wheel.

7. A grouser, including two diverging walls having their outer surfaces of a curvature conforming substantially to a wheel rim to which they are to be applied, each wall having its outer end formed to provide grouser points.

M FLORIN DONAHAE.